US012146558B2

(12) United States Patent
Park et al.

(10) Patent No.: US 12,146,558 B2
(45) Date of Patent: Nov. 19, 2024

(54) PLATE-SHAPED HARMONIC REDUCER

(71) Applicant: SEOUL NATIONAL UNIVERSITY R&DB FOUNDATION, Seoul (KR)

(72) Inventors: Jaeheung Park, Gyeonggi-do (KR); Seung Bin You, Gyeonggi-do (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 118 days.

(21) Appl. No.: 17/797,394

(22) PCT Filed: Feb. 9, 2021

(86) PCT No.: PCT/KR2021/001741
§ 371 (c)(1),
(2) Date: Aug. 3, 2022

(87) PCT Pub. No.: WO2021/162430
PCT Pub. Date: Aug. 19, 2021

(65) Prior Publication Data
US 2023/0088852 A1  Mar. 23, 2023

(30) Foreign Application Priority Data
Feb. 11, 2020 (KR) .................. 10-2020-0016640

(51) Int. Cl.
*F16H 49/00* (2006.01)
*F16H 1/32* (2006.01)
(52) U.S. Cl.
CPC ............ *F16H 49/001* (2013.01); *F16H 1/32* (2013.01); *F16H 2049/003* (2013.01); *F16H 2049/006* (2013.01)

(58) Field of Classification Search
CPC ..................................... F16H 49/001
USPC ........................................... 74/640
See application file for complete search history.

(56) References Cited

U.S. PATENT DOCUMENTS

| | | | | |
|---|---|---|---|---|
| 2,849,897 A | * | 9/1958 | Walma | G04B 13/00 74/411 |
| 3,187,605 A | * | 6/1965 | Stiff | F16H 49/001 74/640 |
| 3,525,890 A | * | 8/1970 | Buchanan, Jr. | F16H 1/321 310/82 |
| 3,532,005 A | * | 10/1970 | Carpenter | F16H 49/001 74/640 |
| 4,646,587 A | * | 3/1987 | Danel | F16H 49/001 74/640 |

(Continued)

FOREIGN PATENT DOCUMENTS

JP  60-201144 A  10/1985
JP  05-044794 A  2/1993

(Continued)

OTHER PUBLICATIONS

Request for the Submission of an Opinion for KR 10-2020-0016640 dispatched May 14, 2021, all pages.

(Continued)

*Primary Examiner* — Ha Dinh Ho
(74) *Attorney, Agent, or Firm* — Kilpatrick Townsend & Stockton LLP

(57) ABSTRACT

Provided is a plate harmonic reducer, and more particularly, a plate harmonic reducer, in which design may be further simplified and a manufacturing cost may be reduced.

10 Claims, 11 Drawing Sheets

(56) References Cited

U.S. PATENT DOCUMENTS

| | | | |
|---|---|---|---|
| 5,893,813 A | | 4/1999 | Yamamoto |
| 8,210,070 B2* | | 7/2012 | Takahashi ............... F16H 1/321 |
| | | | 74/640 |
| 9,494,223 B2* | | 11/2016 | Jensen .................. F16H 49/001 |
| 2019/0264791 A1 | | 8/2019 | Atmur et al. |

FOREIGN PATENT DOCUMENTS

| | | |
|---|---|---|
| KR | 19960023919 A | 7/1996 |
| KR | 20100049916 A | 5/2010 |
| KR | 20180061530 A | 6/2018 |

OTHER PUBLICATIONS

Written Decision on Registration for KR 10-2020-0016640 dispatched Feb. 16, 2022, all pages.
International Search Report for PCT/KR2021/001741 dated Jun. 22, 2021, all pages.

* cited by examiner

_PLATE-SHAPED HARMONIC REDUCER_

TECHNICAL FIELD

One or more embodiments relate to a plate harmonic reducer, and more particularly, to a plate harmonic reducer, in which design may be further simplified and a manufacturing cost may be reduced.

BACKGROUND ART

As reducers used for controlling and operating a robot, harmonic reducers are used together with RV reducers and planetary gears.

FIGS. 1 and 2 are views showing the structure of a harmonic reducer according to the related art. The principle of the harmonic reducer according to the related art will be described as follows with reference to FIGS. 1 and 2.

The harmonic reducer according to the related art includes three main components excluding a shaft and a bearing. That is, three main components are an outermost circular spline member 10, a middle flex spline member 20, and a central wave generator member 30. The flex spline member 20 is made of a deformable material such as an elastic metal or an elastic rigid body.

A first toothed gear portion 12 is provided inside the circular spline member 10, and a second toothed gear portion 22 is provided outside the flex spline member 20.

The first toothed gear portion 12 and the second toothed gear portion 22 have a certain number of teeth, and the number of toothed gears of the first toothed gear portion 12 and the number of toothed gears of the second toothed gear portion 22 are different from each other.

The wave generator member 30 is connected to a certain input terminal, and the flex spline member 20 is connected to a certain output terminal. In addition, the circular spline member 10 may be connected to a certain housing.

When an input power T1 is input to the wave generator member 30, the wave generator member 30 may rotate, as indicated by an arrow R1. The first toothed gear portion 12 and the second toothed gear portion 22 are engaged with each other at engaging portions D1 and D2. Thus, when the wave generator member 30 rotates, due to a difference in the number of toothed gears between the first toothed gear portion 12 and the second toothed gear portion 22, the flex spline member 20 rotates, as indicated by an arrow R2, and outputs an output power T2 to the output terminal.

In this case, due to the difference in the number of toothed gears between the first toothed gear portion 12 and the second toothed gear portion 22, the rotational angular speed of the output terminal is reduced at a constant reduction ratio compared to the rotational angular speed of the input terminal.

Such harmonic reducers are widely used because they have high speed reduction ratio, rotational precision, zero backlash, small size and weight reduction.

However, it is difficult to design the profile of the elliptical wave generator 30, and a manufacturing process is complicated. In addition, the lighter a robot joint portion is and the smaller the volume is, the easier it is to control the robot joint portion, and there are many problems to be solved, such as excellent torque efficiency and low noise. However, the harmonic reducer according to the related art does not sufficiently solve these problems. Furthermore, in the harmonic reducer according to the related art, the rotation direction of the input terminal and the rotation direction of the output terminal are opposite to each other.

In addition, in the harmonic reducer according to the related art, as shown in FIG. 1, the flex spline member 20 has a cup shape and has a relatively large top and bottom width T. Thus, it is difficult to design thin harmonic reducers.

Thus, harmonic reducers capable of solving the above problems need to be developed.

DESCRIPTION OF EMBODIMENTS

Technical Problem

One or more embodiments include a plate harmonic reducer, in which design may be further simplified and a manufacturing cost may be reduced.

Additional aspects will be set forth in part in the description which follows and, in part, will be apparent from the description, or may be learned by practice of the presented embodiments of the disclosure.

According to one or more embodiments, a plate harmonic reducer includes a circular spline member of a disc shape having a certain radius with a first central axis, a flex spline member of a disc shape having a certain radius with a second central axis and formed of an elastic material, and a wave generator member having a third central axis, wherein the flex spline member is positioned on the circular spline member, and the wave generator member is positioned on the flex spline member, and the first central axis, the second central axis, and the third central axis are positioned on the same line, and the circular spline member includes a first toothed gear portion, and the first toothed gear portion is formed on a top surface of the circular spline member and is formed along an outer circumference of the circular spline member, and the flex spline member includes a second toothed gear portion, and the second toothed gear portion is formed on a bottom surface of the flex spline member and is formed along an outer circumference of the flex spline member, and the first toothed gear portion and the second toothed gear portion are positioned to overlap in a vertical direction, and the wave generator member presses at least part of the flex spline member so that at least part of the first toothed gear portion and at least part of the second toothed gear portion are engaged with each other, and when the wave generator member rotates around the third central axis, portions where the first toothed gear portion and the second toothed gear portion are engaged with each other, vary, and a number of toothed gars of the first toothed gear portion is different from a number of toothed gears of the second toothed gear portion.

The wave generator member may be connected to a certain input terminal and may be rotatable, and the flex spline member may be connected to a certain output terminal, and a rotation speed of the output terminal is reduced with a certain reduction ratio compared to a rotation speed of the input terminal.

The wave generator member may have a shape of a bar extending in a horizontal direction, and by using the third central axis as a center, a pressing protrusion protruding downwardly may be provided at one end of the wave generator member and the other end that is positioned to the one end, and the pressing protrusion may be positioned on the second toothed gear portion of the flex spline member, and portions of the first toothed gear portion and the second toothed gear portion that are positioned under the pressing protrusion, may be engaged with each other.

The plate harmonic reducer may further include a centra shaft, wherein the central shaft is connected to the second central axis of the flex spline member, and the flex spline member and the center shaft rotate integrally.

The circular spline member may have a first through hole penetrating vertically in a center thereof, and the center shaft may pass through the first through hole and may extend in a downward direction.

A first bearing member through which the center shaft passes vertically may be arranged in the first through hole.

The wave generator member may have a third through hole penetrating vertically in a center thereof, and the center shaft may pass through the third through hole and may extend in an upward direction.

A second bearing member through which the center shaft passes vertically may be arranged in the third through hole.

The circular spline member may have a first inclined surface on a top surface thereof, the first inclined surface being inclined downwardly toward an outside in a radial direction with the first central axis as a center.

The flex spline member may have a (2-1)-th inclined surface thereof, the (2-1)-th inclined surface being inclined downwardly toward an outside in a radial direction with the second central axis as a center.

The circular spline member may have a first inclined surface on a top surface thereof, the first inclined surface being inclined downwardly toward an outside in a radial direction with the first central axis as a center, and the flex spline member may have a 2-1)-th inclined surface thereof, the (2-1)-th inclined surface being inclined downwardly toward an outside in a radial direction with the second central axis as a center, and inclination angles of the first inclined surface and the (2-1)-th inclined surface may be different from each other.

The flex spline member may have a (2-2)-th inclined surface thereof, the (2-2)-th inclined surface being inclined downwardly toward an outside in a radial direction with the second central axis as a center.

The wave generator member may have a shape of a bar extending in a horizontal direction, and a pressing roller may be provided at one end and the other end of the wave generator member, respectively, and the pressing roller may be positioned on a second toothed gear portion of the flex spline member, and portions of the first toothed gear portion and the second toothed gear portion that are positioned under the pressing roller may be engaged with each other.

BRIEF DESCRIPTION OF DRAWINGS

The above and other aspects, features, and advantages of certain embodiments of the disclosure will be more apparent from the following description taken in conjunction with the accompanying drawings, in which.

MODE OF DISCLOSURE

Figure 1:
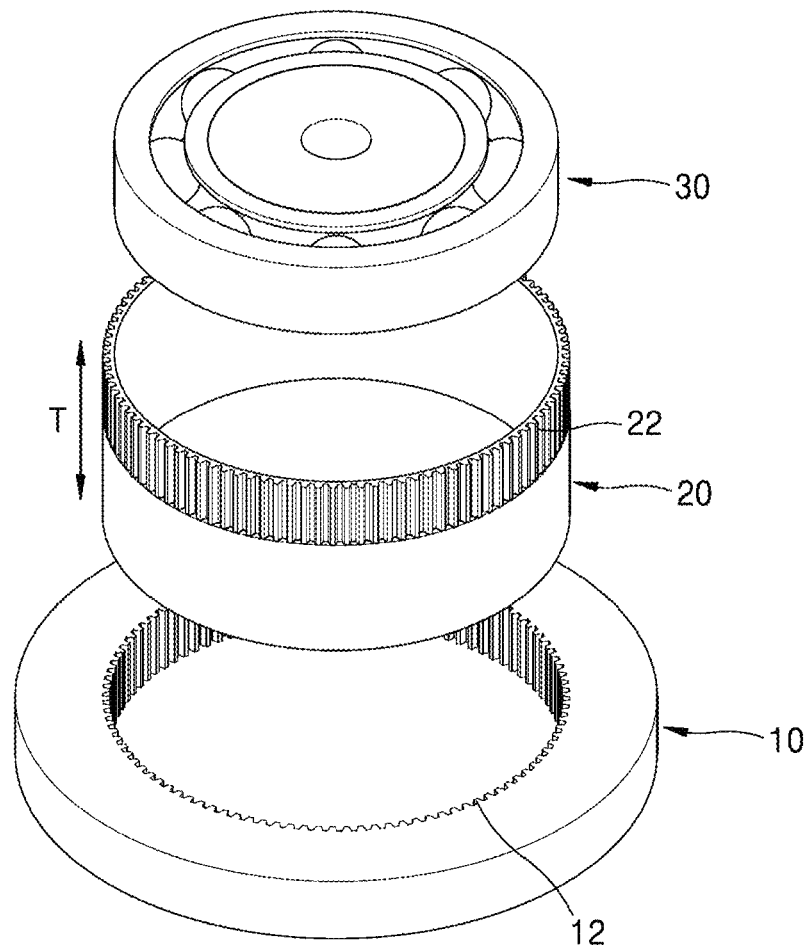
FIGS. 1 and 2 are views showing the structure of a harmonic reducer according to the related art.
Figure 2:
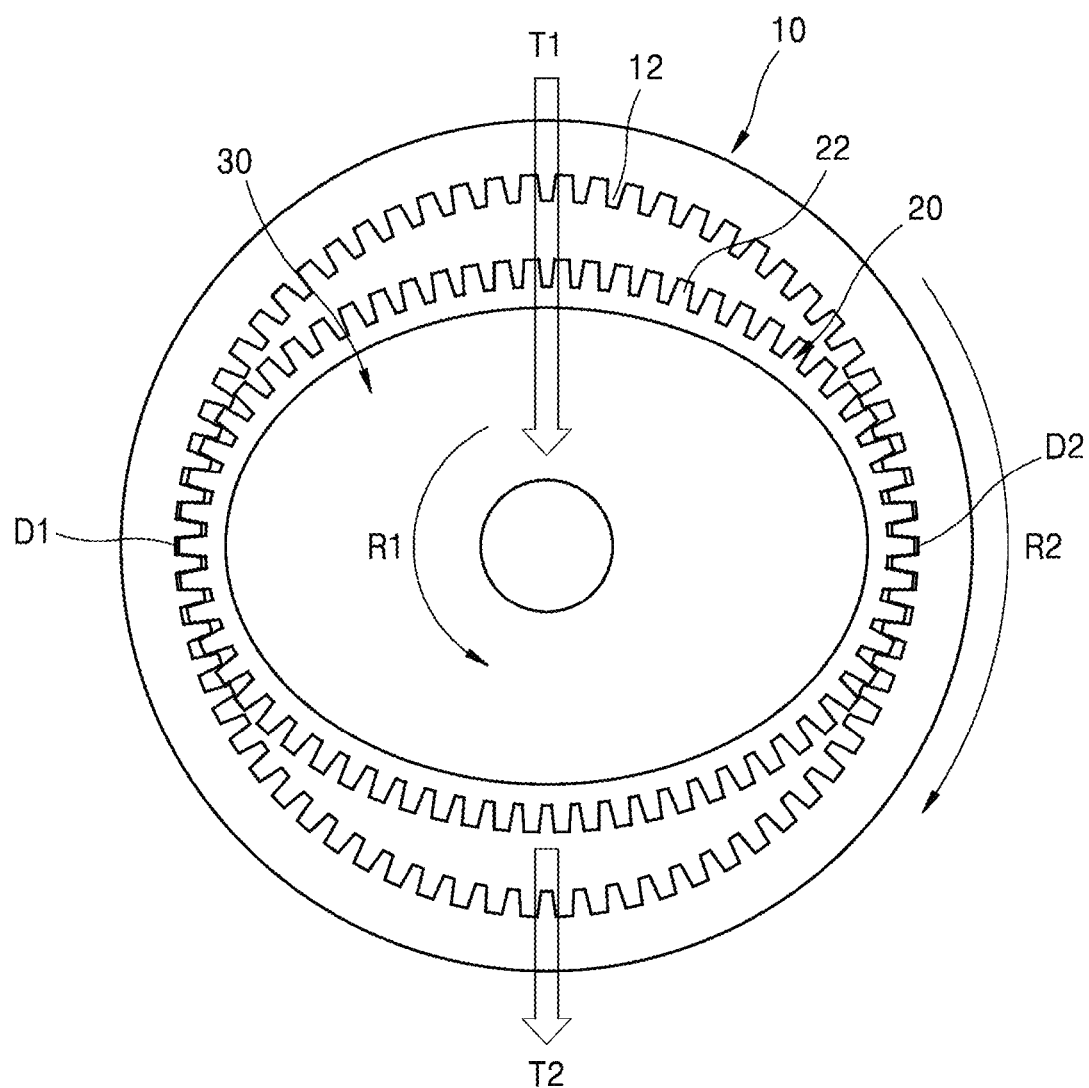

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the present disclosure will be described in more detail with reference to the accompanying drawings showing embodiments of the present disclosure.

Figure 3:
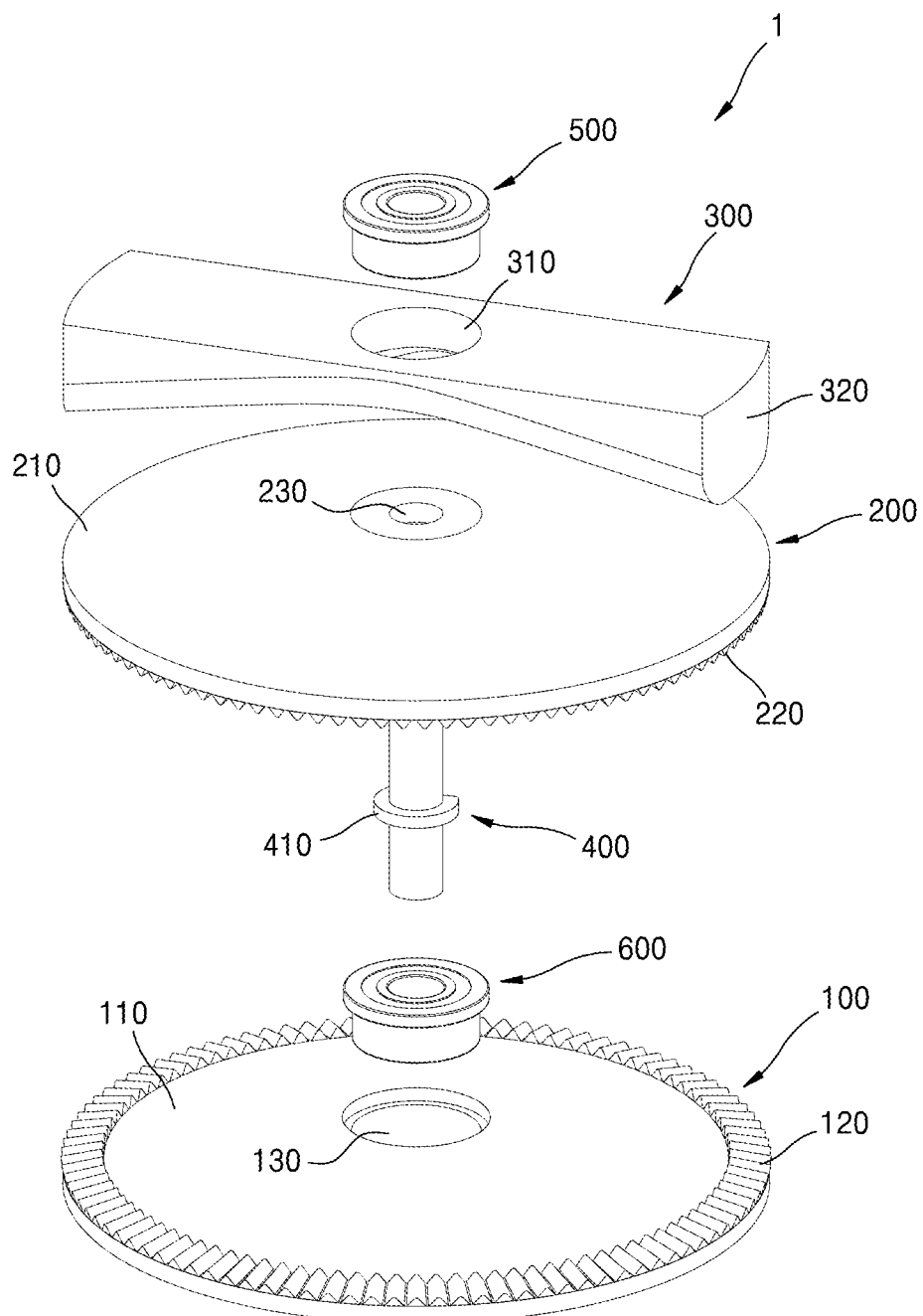
FIGS. 3 and 4 are views showing the exploded structure of a plate harmonic reducer according to a first embodiment.
Figure 4:
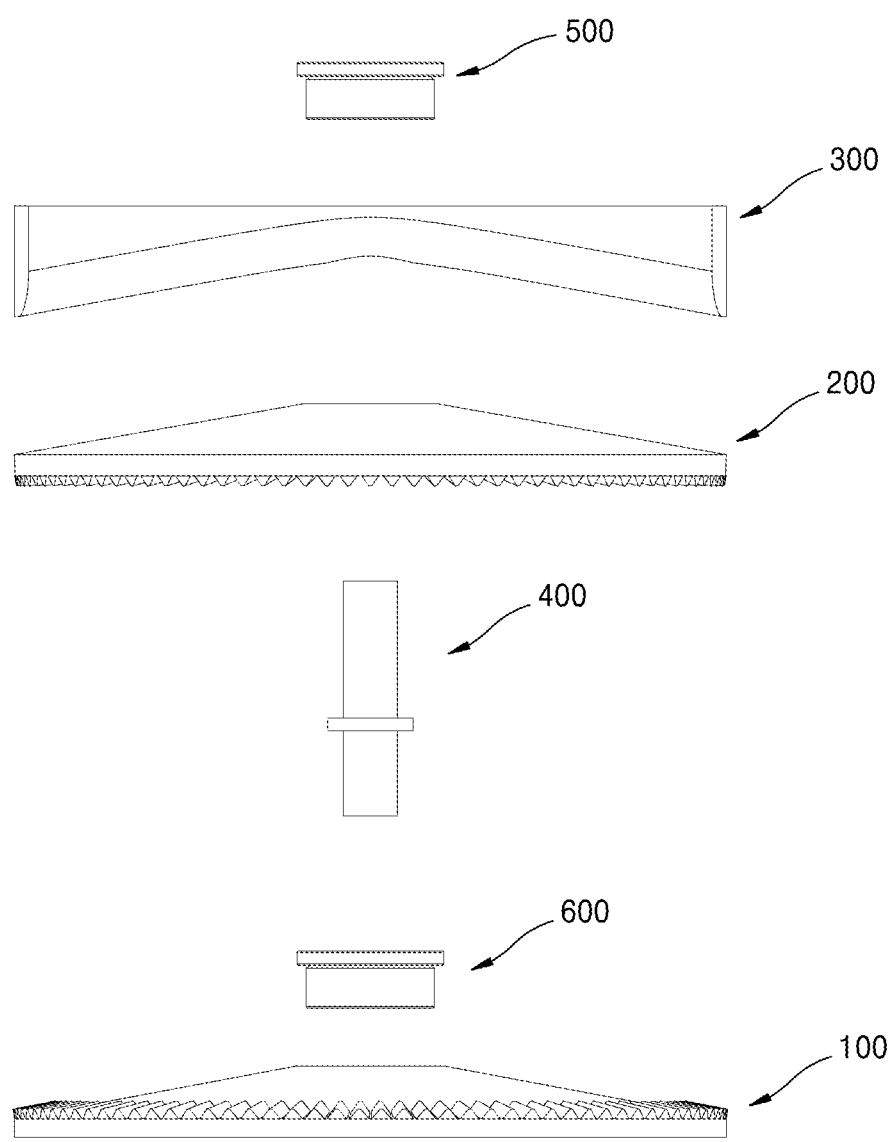
Figure 5:
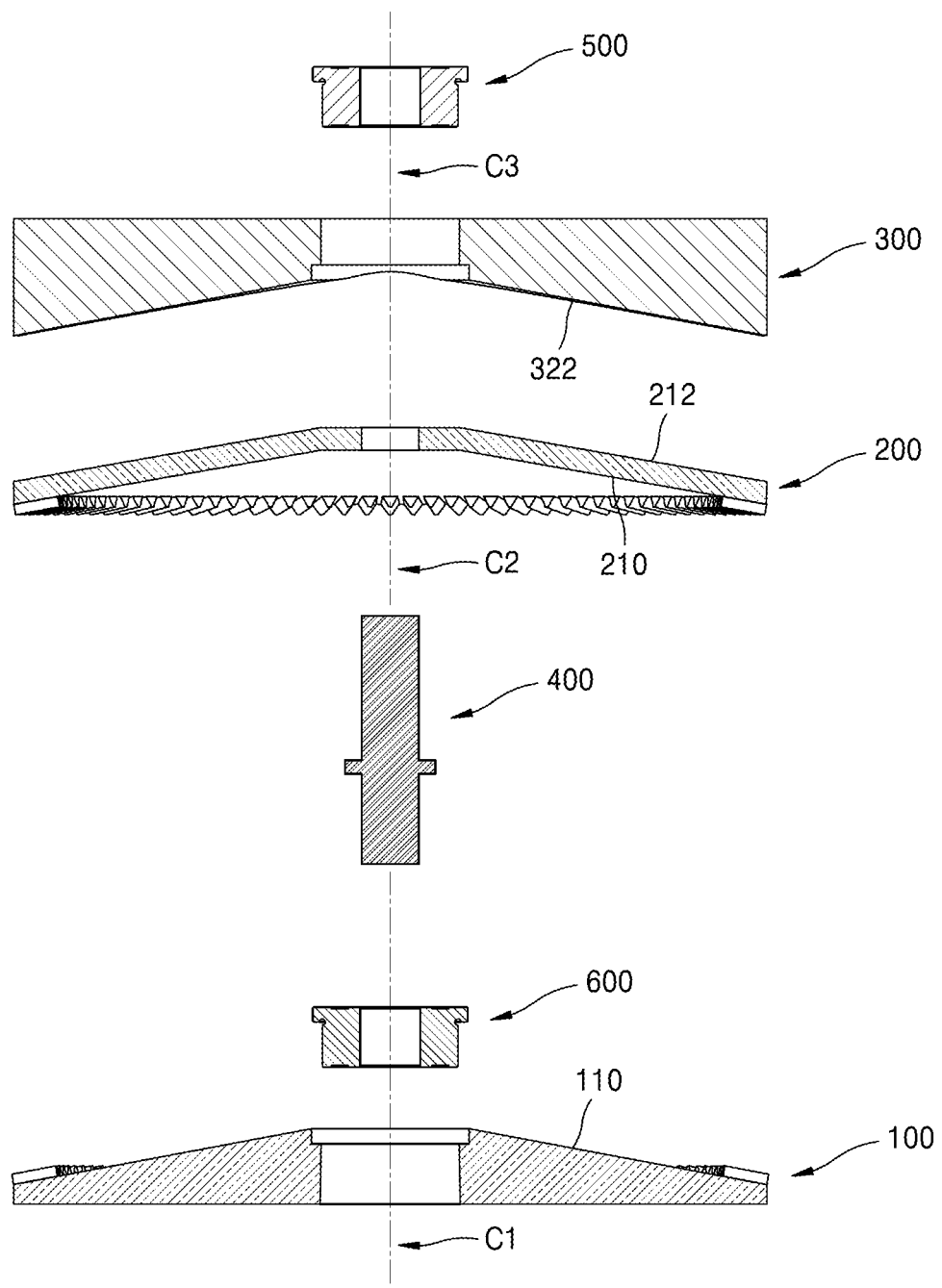
FIG. 5 is a cross-sectional view of FIG. 4.

FIGS. 3 and 4 are views showing the exploded structure of a plate harmonic reducer 1 according to a first embodiment, and FIG. 5 is a cross-sectional view of FIG. 4.

A circular spline member 100 includes a disc-shaped member. Thus, the circular spline member 100 has a certain radius with a first central axis C1.

According to an embodiment, a first inclined surface 110 may be formed on a top surface of the circular spline member 100 to be inclined downwardly toward an outside in a radial direction with the first central axis C1 as the center. The first inclined surface 110 may have a certain inclination angle.

According to an embodiment, a first through hole 130 penetrating vertically may be formed in the center of the circular spline member 100. A first bearing member 500 may be inserted into the first through hole 130.

A first toothed gear portion 120 may be formed on the outer circumference of the top surface of the circular spline member 100.

The first toothed gear portion 120 may be formed along the outer circumference of the top surface of the circular spline member 100. The first toothed gear portion 120 may have a configuration in which toothed gears protruding in an upward direction are repeatedly formed along a circumferential direction of the circular spline member 100.

The first toothed gear portion 120 has a certain number of toothed gears N1.

The flex spline member 200 includes a disc-shaped member. Thus, the flex spline member 200 has a certain radius with a second central axis C2.

The flex spline member 200 is formed to be flexible. That is, the flex spline member 200 may be formed of an elastically deformable material. For example, the flex spline member 200 may be formed of an elastic metal or a synthetic resin material.

According to an embodiment, a (2-1)-th inclined surface 210 may be formed on a bottom surface of the circular spline member 100 to be inclined downwardly toward the outside in the radial direction with the second central axis CS as the center. The (2-1)-th inclined surface 210 may have a certain inclination angle.

According to an embodiment, a (2-2)-th inclined surface 212 may be formed on a top surface of the circular spline member 100 to be inclined downwardly toward the outside in the radial direction with the second central axis CS as the center. The (2-2)-th inclined surface 212 may have a certain inclination angle.

According to an embodiment, inclination angles of the (2-1)-th inclined surface 210 and the (2-2)-th inclined surface 212 may be the same. According to an embodiment, the inclination angles of the (2-1)-th inclined surface 210 and the (2-2)-th inclined surface 212 may be different from each other.

Furthermore, the inclination angles of the first inclined surface 110 and the (2-1)-th inclined surface 210 may be the same or different from each other.

According to an embodiment, a second through hole 230 penetrating vertically may be formed in the center of the flex spline member 200. A center shaft 400 to be described later may be connected to the second through hole 230.

A second toothed gear portion 220 may be formed on the outer circumference of the bottom surface of the flex spline member 200.

The second toothed gear portion 220 may be formed along the outer circumference of the bottom surface of the flex spline member 200. The second toothed gear portion 220 may have a configuration in which toothed gears protruding downwardly are repeatedly formed along the circumferential direction of the flex spline member 200.

The second toothed gear portion 200 may have a certain number of toothed gears N2.

The wave generator member 300 may include a member having a shape of a bar extending with a certain length in a horizontal direction. A third central axis C3 may be provided in the center of the wave generator member 300 in a longitudinal direction.

A pressing protrusion 320 protruding downwardly may be provided at one end and the other end of the longitudinal direction of the wave generator member 300. The pressing protrusion 320 may include a portion further protruding downwardly compared to other portions.

For example, as shown in the drawings, a third inclined surface 322 may be formed on the bottom surface of the wave generator member 300. That is, the bottom surface of the wave generator member 300 may configured as an inclined surface that goes downward from the third central axis C3 of the wave generator member 300 toward an outer end. Thus, the outer end of the wave generator member 300 may further protrude downwardly than other portions, and there may be an embodiment in which the protruding portion constitutes the pressing protrusion 320.

According to an embodiment, a third through hole 310 penetrating vertically may be formed in the center of the wave generator member 300 in the longitudinal direction. A second bearing member 600 may be provided in the third through hole 310.

The center shaft 400 may be a certain shaft extending vertically. The center shaft 400 may be connected to the second central axis C2 of the flex spline member 200 and may extend vertically. Thus, the center shaft 400 may rotate integrally with the flex spline member 200.

A certain fixing unit 410 may be provided on the center shaft 400 and may be fixed to the flex spline member 200.

Hereinafter, the combination relationship between the circular spline member 100, the flex spline member 200, the wave generator member 300, and the center shaft 400 will be described.

The flex spline member 200 may be positioned on the circular spline member 100, and the wave generator member 300 may be positioned on the flex spline member 200. The second toothed gear portion 220 of the flex spline member 200 may be positioned on the first toothed gear portion 120 of the circular spline member 100.

Figure 6:
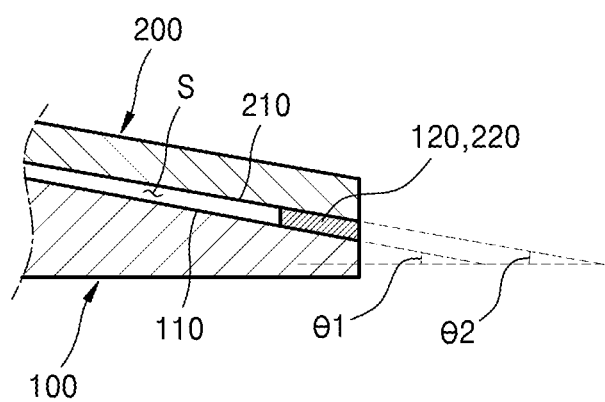
FIG. 6 is a cross-sectional view showing a state in which a flex spline member is positioned on a circular spline member of the plate harmonic reducer according to the first embodiment.

FIG. 6 is a cross-sectional view showing a state in which the flex spline member 200 is positioned on the circular spline member 100 of the plate harmonic reducer 1 according to the first embodiment.

A gap S may be formed between the top surface of the circular spline member 100 and the bottom surface of the flex spline member 200. Thus, contact between the circular spline member 100 and the flex spline member 200 and other portions than the first toothed gear portion 120 and the second toothed gear portion 220 may be minimized.

In this case, as described above, an inclination angle θ1 of the first inclined surface 110 and an inclination angle θ2 of the (2-1)-th inclined surface 210 may be different from each other.

As an example, as shown in FIG. 6, the case where the inclination angles of the first inclined surface 110 and the (2-1)-th inclined surface 210 are different from each other, will be described as below.

When the flex spline member 200 is positioned on the circular spline member 100, the first central axis C1 and the second central axis C2 may be on the same line. When the inclination angle θ1 of the first inclined surface 110 is greater than the inclination angle θ2 of the (2-1)-th inclined surface 210, the gap S may be increased toward the outside of the central axes C1 and C2 in the radial direction. In this way, when the inclination angles of the first inclined surface 110 and the (2-1)-th inclined surface 210 are different from each other, contact friction between the circular spline member 100 and the flex spline member 200 may be minimized, and design may be further simplified.

The pressing protrusion 320 of the wave generator member 300 may be positioned on part of the second toothed gear portion 200 of the flex spline member 200.

The center shaft 400 may be inserted into the second through hole 230 of the flex spline member 200 and combined therewith. The center shaft 400 and the flex spline member 200 may rotate integrally.

In the drawings, the center shaft 400 simultaneously extends in the vertical direction of the flex spline member 200. However, embodiments are not limited thereto. The center shaft 400 may extend in an upward direction, a downward direction, or a vertical direction of the flex spline member 200.

When the center shaft 400 extends in the upward direction of the flex spline member 200, the center shaft 400 may pass through the third through hole 310 of the wave generator member 300 and the second bearing member 600.

When the center shaft 400 extends in the downward direction of the flex spline member 200, the center shaft 400 may pass through the first through hole 130 of the circular spline member 100 and the first bearing member 500.

In addition, the first central axis C1 of the circular spline member 100, the second central axis C2 of the flex spline member 200, and the third central axis C3 of the wave generator member 300 may be positioned on the same line and thus may have a coaxial configuration.

Hereinafter, connection between the input terminal and the output terminal of the plate harmonic reducer 1 according to an embodiment, and the engagement relationship between the first toothed gear portion 120 and the second toothed gear portion 220 by using the wave generator member 300 will be described.

Figure 7:
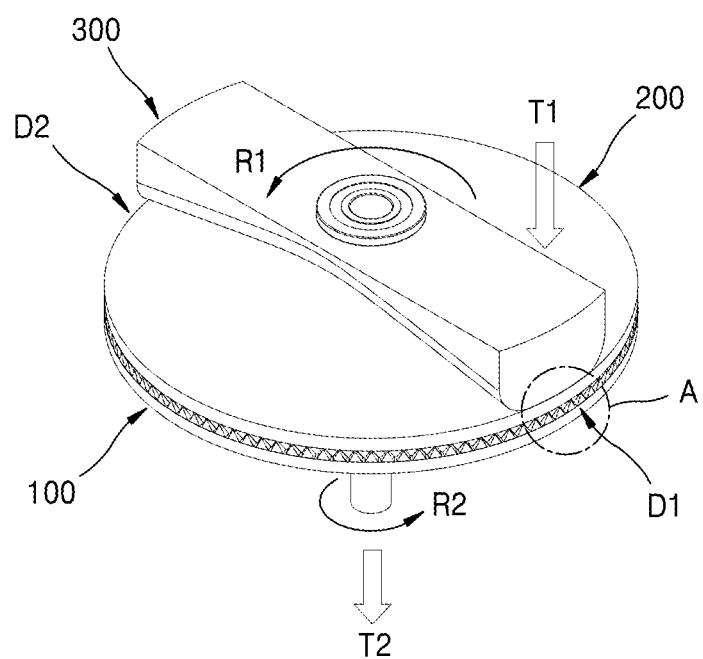
FIG. 7 is a view showing an operation of a plate harmonic reducer according to an embodiment.

FIG. 7 is a view showing an operation of the plate harmonic reducer 1 according to an embodiment, and FIG.

Figure 8:
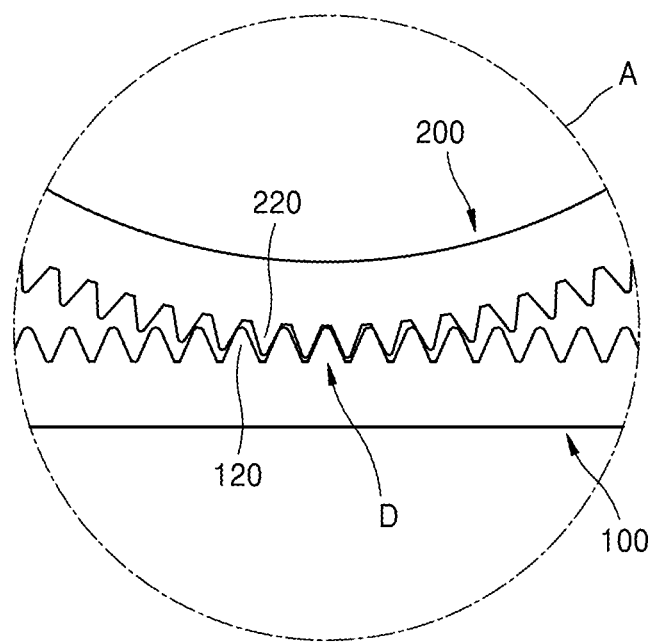
FIG. 8 is an enlarged view of portion A of FIG. 7.

8 is an enlarged view of portion A of FIG. 7. However, FIG. 8 is slightly exaggerated for clarity.

The wave generator member 300 may be connected to a certain input terminal. The input terminal may be connected to a rotating power unit such as a certain motor. Thus, the wave generator member 300 may rotate at a certain angular speed around the third central axis C3 by an input power input from the rotating power unit.

The flex spline member 200 may be connected to a certain output terminal. More precisely, the flex spline member 200 may be connected to the center shaft 400 and may be connected to the output terminal through the center shaft 400. Of course, the center shaft 400 itself may be the output terminal.

As described above, the center shaft 400 may extend in the upward direction, the downward direction, or the vertical direction of the flex spline member 200. Thus, the output terminal may be positioned above or below the plate harmonic reducer 1.

The pressing protrusion 320 of the wave generator member 300 may press the flex spline member 200 to deform at least part (deformed portion) of the flex spline member 200. The deformed portion may be part of a portion in which the second toothed gear portion 220 is formed. The deformed portion may be engaged with the first toothed gear portion 120 of the circular spline member 100 positioned below the flex spline member 200.

Thus, as shown in FIG. 7, portions of the first toothed gear portion 120 and the second toothed gear portion 220 that are located under the pressing protrusion 320 may be engaging portions D1 and D2 in which the first toothed gear portion 120 and the second toothed gear portion 220 are engaged with each other. In addition, power may be transmitted by the engaging portions D1 and D2.

Other portions than the engaging portions D1 and D2 may be non-engaging portions in which the first toothed gear portion 120 and the second toothed gear portion 220 are apart from each other and are not engaged with each other, as shown in FIG. 8.

Thus, in the plate harmonic reducer 1 according to an embodiment, only portions of the second toothed gear portion 220 of the flex spline member 200 that are located under the pressing protrusion 320 of the wave generator member 300 may be elastically partially engaged with the first toothed gear portion 120 of the circular spline member 100.

Hereinafter, the operation of the plate harmonic reducer 1 according to an embodiment will be described in more detail with reference to FIGS. 7 and 8.

As described above, the wave generator member 300 may be connected to a certain input terminal. The input terminal may be connected to a rotating power unit such as a certain motor. Thus, by using the input power T1 transmitted by the rotating power unit, the wave generator member 300 may rotate around the third central axis C3 at a certain angular speed, as indicated by an arrow R1.

When the wave generator member 300 rotates around the third central axis C3 by using a rotational force transmitted from the input terminal, the pressing protrusion 320 of the wave generator member 300 may revolve around the third central axis C3.

As described above, the pressing protrusion 320 may press and deform the flex spline member 200 so that portions (portions under the pressing protrusion 320) of the first toothed gear portion 120 and the second toothed gear portion 220 may be engaged with each other to generate the engaging portions D1 and D2.

Thus, the engaging portions D1 and D2 in which the first toothed gear portion 120 and the second toothed gear portion 220 are engaged with each other, may be circulated along the rotation direction of the wave generator member 300.

In this case, since the number of toothed gears of the first toothed gear portion 120 and the number of toothed gears of the second toothed gear portion 220 are different from each other, the flex spline member 200 rotates at a certain angular speed, as indicated by an arrow R2. Thus, an output power T2 may be generated.

For example, it is considered that the number of toothed gears N2 of the second toothed gear portion 220 of the flex spline member 200 is 52 and the number of toothed gears N1 of the first toothed gear portion 100 of the circular spline member 100 is 50, as follows.

A case where the wave generator member 300 rotates around the circular spline member 100 once, will be considered. Since the circular spline member 100 is relatively fixed, the pressing protrusion 320 of the wave generator member 300 returns to the same tooth position of the circular spline member 100 when 50 toothed gears of the first toothed gear portion 120 are passed. However, even when the flex spline member 200 passes 50 toothed gears, the flex spline member 200 does not come to the same tooth position located at a position where the rotation starts. In order to solve this inconsistency, the flex spline member 200 and the center shaft 400 connected to the flex spline member 200 may each rotate by an angle corresponding to two toothed gears of the flex spline member 200 for each rotation of a rotation axis.

The flex spline member 200 may be combined with the center shaft 400, and the output terminal may be connected to the center shaft 400. As a result, as described above, when the number of toothed gears N2 of the second toothed gear portion 220 of the flex spline member 200 is 52 and the number of toothed gears N1 of the first toothed gear portion 120 of the circular spline member 100 is 50, one rotation of the center shaft 400 may be performed every 26 rotations of the wave generator member 300 connected to the input terminal. Thus, transmission of a rotation power having a large reduction ratio of 1/26 may be performed.

The reduction ratio may be selected by selecting the number of toothed gears of the second toothed gear portion 220 of the flex spline member 200 and the number of toothed gears of the first toothed gear portion 120 of the circular spline member 100, respectively. For example, when the second toothed gear portion 220 of the flex spline member 200 has 102 toothed gears and the first toothed gear portion 120 of the circular spline member 100 has 100 toothed gears, the reduction ratio of 1/50 may be implemented.

Hereinafter, the effects of the plate harmonic reducer 1 according to an embodiment will be described.

In the case of a harmonic reducer according to the related art, an elliptical wave generator member is positioned in the center. This structure is a form that fills all the insides of the circular spline member of the harmonic reducer. Thus, a wave generator has a large volume and weight. In addition, there is a problem that it is not easy to design the profile of the ellipse. In addition, the elliptical wave generator member of the harmonic reducer according to the related art has a structure in which deformation is continuously applied to a ball bearing as well as a flex spline member for elastic deformation. Thus, the life and precision of a bearing may deteriorate.

In the plate harmonic reducer 1 according to an embodiment, since the elliptical wave generator member 300 according to the related art has been removed, weight reduction and miniaturization may be achieved. In addition, the profile design is also easier compared to the plate harmonic reducer 1 according to the related art. Furthermore, the life and precision of the ball bearing may be kept constant. In addition, since a cup-shaped flex spline member is removed and a plate-shaped flex spline member 200 is used, a plate harmonic reducer 1 having a small thickness may be provided.

In addition, since the flex spline member of the harmonic reducer according to the related art is configured in a cylindrical shape, there is a drawback of forming toothed gears while being pressed into a mold made of a tooth shape and rotating.

On the other hand, the flex spline member 200 of the plate harmonic reducer 1 according to an embodiment may be manufactured while being completed in one station (taken once and molded). In addition, due to this manufacturing process, it is possible to control the assembly precision that affects performance through an axial gap or preload. Thus, the required machining precision to achieve the same performance criterion is relatively low. In other words, there is no oval shape processing process, and the required precision for each part is also relatively low. Thus, production efficiency is superior in mass production, and a manufacturing cost may be reduced.

The harmonic reducer according to the related art causes large deformation in a local area.

On the other hand, the flex spline member 200 of the plate harmonic reducer 1 according to an embodiment has a large area of the flex spline member 200 causing elastic deformation. Thus, since stress concentration in an elastically deformed region is less, torque efficiency may be improved and fatigue accumulation of metal may be reduced.

In addition, in the harmonic reducer according to the related art, it is difficult to meet the requirements required in the market because the length of the harmonic reducer directly increases in an axial direction when a contact surface is increased. This makes it difficult to change a contact angle, a contact area, and the like for improving gear engagement.

On the other hand, since the contact area of the plate harmonic reducer 1 according to an embodiment is determined in the direction from the edge of the circle toward the center, it is easy to change the design according to the required requirements. Thus, tooth design, which is one of difficult key design issues in designing a harmonic reducer, may be simplified.

In addition, the plate harmonic reducer 1 according to an embodiment is designed to have an oblique plane effect in which a force pressed vertically up and down during the engagement process of the circular spline member 100 and the flex spline member 200 is transmitted as a horizontal rotational force. Thus, compared to the harmonic reducer according to the related art, tooth design may be simplified.

In addition, according to an embodiment, the rotation direction of an input terminal and the rotation direction of an output terminal may be the same. In addition, an input shaft of the input terminal and an output shaft of the output terminal may be positioned on the same straight line. Thus, the plate harmonic reducer 1 according to an embodiment has a high reduction ratio and may be installed and used in a place where power transmission is required in the same rotation direction.

Figure 9:
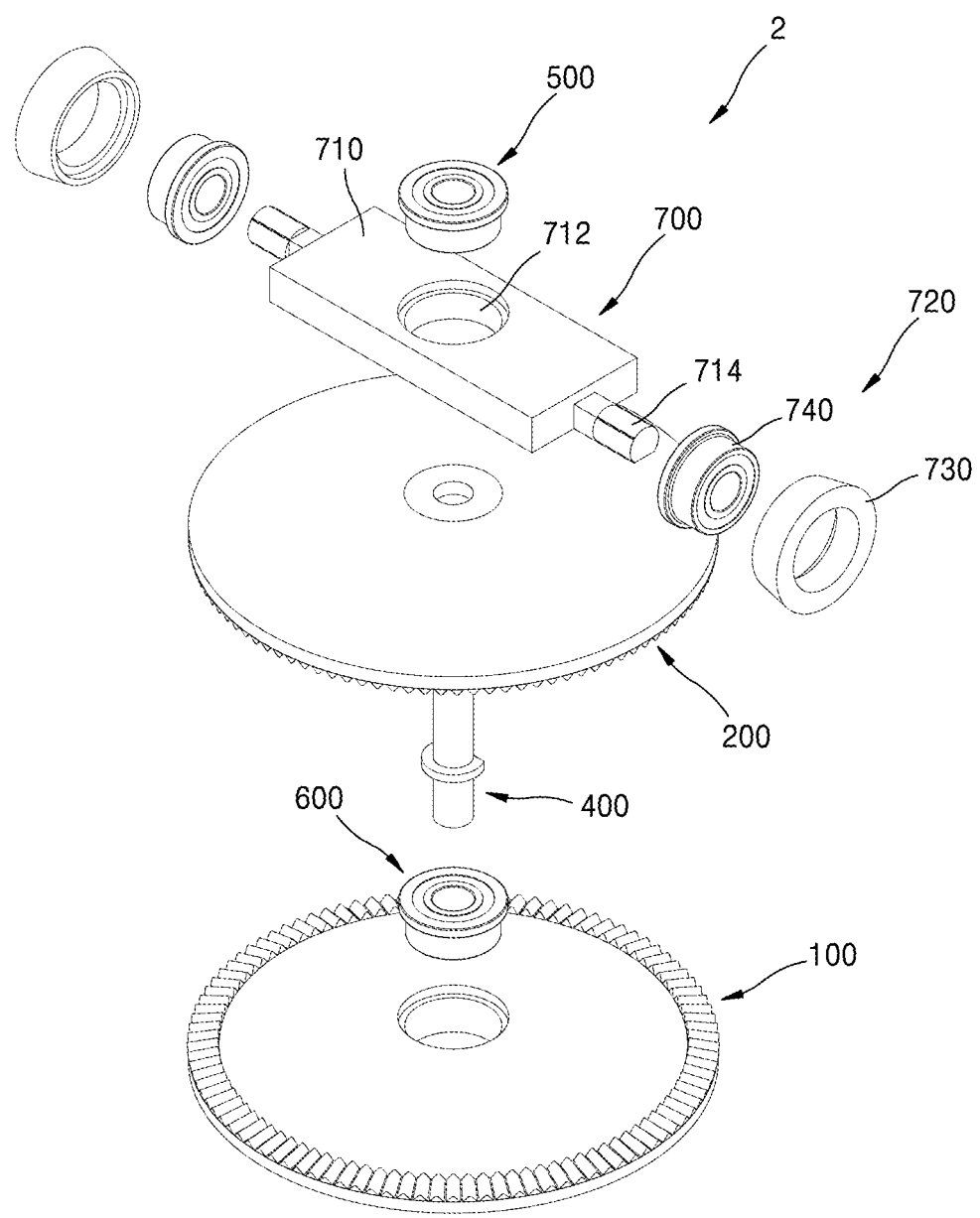
FIGS. 9 and 10 are views showing the exploded structure of a plate harmonic reducer according to a second embodiment from different angles.
Figure 10:
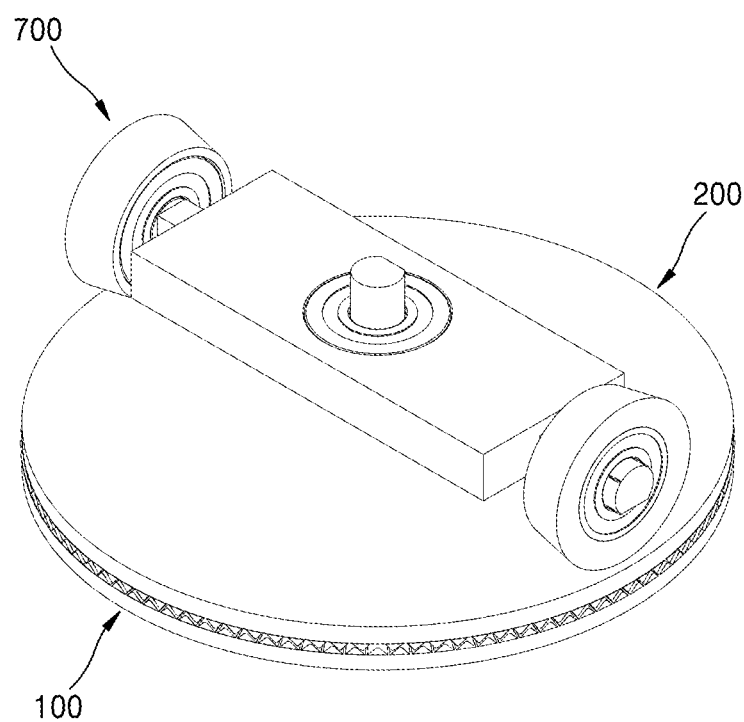
Figure 11:
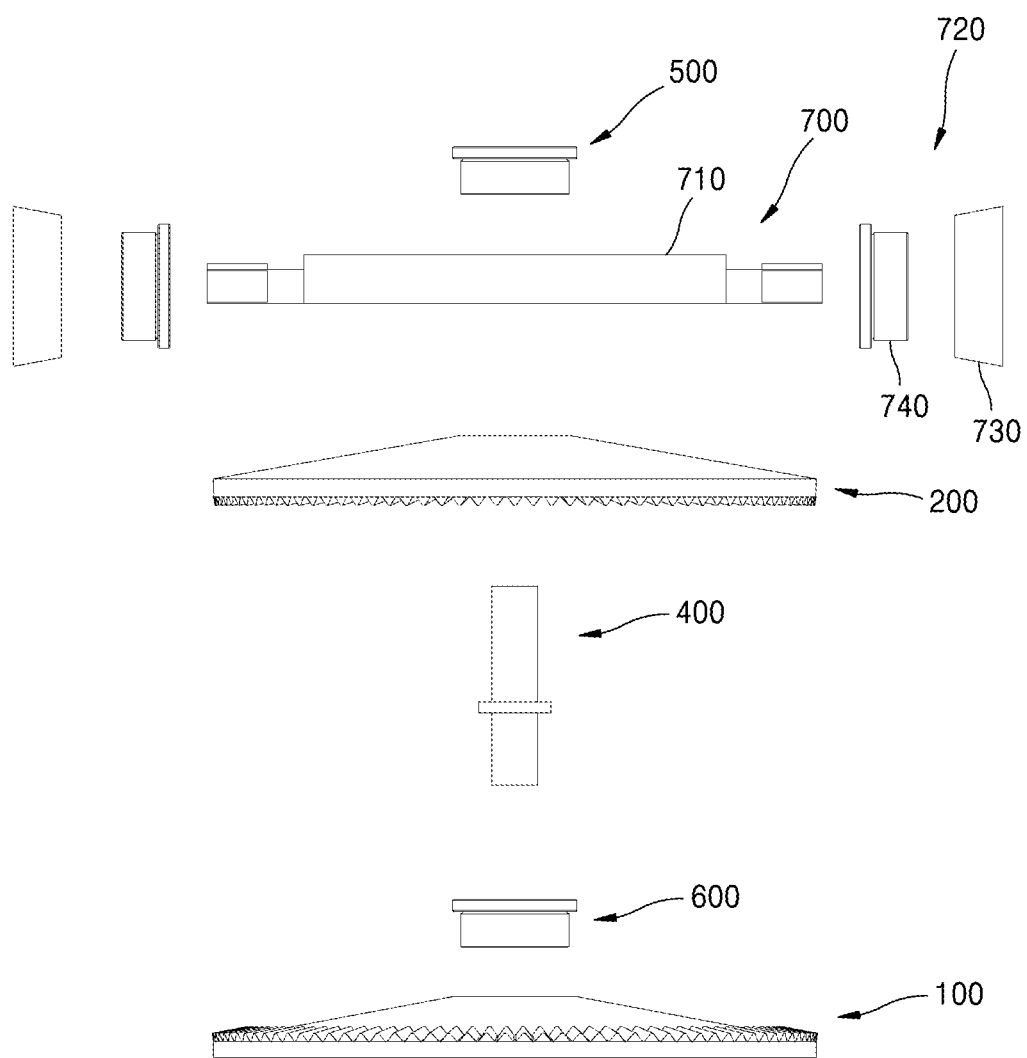
FIG. 11 is a combined view of the plate harmonic reducer according to the second embodiment.

FIGS. 9 and 10 are views showing the exploded structure of a plate harmonic reducer 2 according to a second embodiment from different angles, and FIG. 11 is a combined view of the plate harmonic reducer 2 according to the second embodiment.

The plate harmonic reducer 2 according to the second embodiment may correspond to the plate harmonic reducer 1 according to the first embodiment and may include a circular spline member 100, a flex spline member 200, a wave generator member 700, and a center shaft 400. Here, the configuration of the circular spline member 100, the flex spline member 200, and the center shaft 400 may be the same as that of the first embodiment. Thus, an overlapping description will be described, and only the description of a wave generator member 700 which is a configuration different from the first embodiment, will be described.

The wave generator member 700 of the plate harmonic reducer 2 according to the second embodiment may include a rotation body 710 and a pressing roller 720.

The rotation body 710 may be configured as a member having a shape of a bar extending with a certain length in the horizontal direction. A third central axis C3 may be provided in the center of the rotation body 710 in the longitudinal direction.

A connection shaft 714 protruding in the longitudinal direction of the rotation body 710 may be provided at one end and the other end of the rotation body 710 in the longitudinal direction.

The pressing roller 720 may be connected to the connection shaft 714. The pressing roller 720 may be rotatable around a central axis extending in the longitudinal direction of the rotation body 710. The pressing roller 720 may include a rolling bearing 730 connected to the connection shaft 714 and a roller body 740 coupled to the outer circumference of the rolling bearing 730.

The bottom surface of the pressing roller 720 may protrude downwardly from the bottom surface of the rotation body 710.

Thus, when the wave generator member 700 of the plate harmonic reducer 2 according to the second embodiment is coupled to the flex spline member 200, the pressing roller 720 may press the flex spline member 200 downwardly. Thus, the pressing roller 720 may be, in another concept, a radial roller that applies pressure in a direction of the third central axis C3 and rotates around a radial axis extending in a direction perpendicular to the third central axis C3.

Thus, the pressing roller 720 may be positioned on the second toothed gear portion 220 of the flex spline member 200 to engage the second toothed gear portion 220 and the first toothed gear portion 120 with each other. When the wave generator member 700 rotates on the flex spline member 200, the pressing roller 720 may roll and revolve around the third central axis C3 on the flex spline member 200.

Thus, the pressing roller 720 may achieve substantially the same function as the pressing roller 320 of the wave generator member 300 of the plate harmonic reducer 1 according to the first embodiment. However, since the pressing roller 720 may roll on the flex spline member 200 and revolve, less friction may occur.

In the case of a harmonic reducer according to the related art, an elliptical wave generator member is located in the center. This structure is a form that fills all the insides of the circular spline member of the harmonic reducer. Thus, a wave generator has a large volume and weight. In addition, there is a problem that it is not easy to design the profile of the ellipse. In addition, the elliptical wave generator member of the harmonic reducer according to the related art has a structure in which deformation is continuously applied to a ball bearing as well as a flex spline member for elastic deformation. Thus, the life and precision of a bearing may deteriorate. In addition, in the case of a harmonic reducer according to the related art, there is a limitation in providing a thin harmonic reducer, because a cup-shaped flex spline member is required.

In the plate harmonic reducer according to an embodiment, since the elliptical wave generator member of the plate harmonic reducer according to the related art has been removed, weight reduction and miniaturization may be achieved. In addition, in the plate harmonic reducer according to an embodiment, it is easier to design a profile compared to the harmonic reducer according to the related art. Furthermore, in the plate harmonic reducer according to an embodiment, the life and precision of the bearing may be kept constant. In addition, in the plate harmonic reducer according to an embodiment, since the cup-shaped flex spline member is removed and the plate-shaped flex spline member is used, a plate harmonic reducer having a small thickness may be provided.

In addition, since the flex spline member of the harmonic reducer according to the related art is configured in a cylindrical shape, toothed gears are formed while being pressed into a mold made of a tooth shape and rotating.

On the other hand, the flex spline member of the plate harmonic reducer according to an embodiment may be manufactured while being completed in one station (taken once and molded). In addition, in the plate harmonic reducer according to an embodiment, due to this manufacturing process, it is possible to control the assembly precision that affects performance through an axial gap or preload. Thus, in the plate harmonic reducer according to an embodiment, the required machining precision to achieve the same performance criterion is relatively low. In other words, in the plate harmonic reducer according to an embodiment, there is no oval shape processing process, and the required precision for each part is also relatively low. Thus, in the plate harmonic reducer according to an embodiment, production efficiency is superior in mass production, and a manufacturing cost may be reduced.

The harmonic reducer according to the related art causes large deformation in a local area.

On the other hand, the flex spline member of the plate harmonic reducer according to an embodiment has a large area of the flex spline member causing elastic deformation. Thus, in the plate harmonic reducer according to an embodiment, since stress concentration in an elastically deformed region is less, torque efficiency may be improved and fatigue accumulation of metal may be reduced.

In addition, in the harmonic reducer according to the related art, it is difficult to meet the requirements required in the market because the length of the harmonic reducer directly increases in an axial direction when a contact surface is increased. This makes it difficult to change a contact angle, a contact area, and the like for improving gear engagement.

On the other hand, since the contact area of the plate harmonic reducer according to an embodiment is determined in the direction from the edge of the circle toward the center, it is easy to change the design according to the required requirements. Thus, in the plate harmonic reducer according to an embodiment, tooth design, which is one of difficult key design issues in designing the plate harmonic reducer, may be simplified.

In addition, the plate harmonic reducer according to an embodiment is designed to have an oblique plane effect in which a force pressed vertically up and down during the engagement process of the circular spline member and the flex spline member is transmitted as a horizontal rotational force. Thus, in the plate harmonic reducer according to an embodiment, compared to a harmonic reducer according to the related art, tooth design may be simplified.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A plate harmonic reducer comprising:
   a circular spline member of a disc shape having a certain radius with a first central axis;
   a flex spline member of a disc shape having a certain radius with a second central axis and made of an elastic material; and
   a wave generator member having a third central axis, wherein
   the flex spline member is positioned on the circular spline member, and
   the wave generator member is positioned on the flex spline member, and
   the first central axis, the second central axis, and the third central axis are positioned on the same line, and
   the circular spline member comprises a first toothed gear portion, and
   the first toothed gear portion is formed on a top surface of the circular spline member and is formed along an outer circumference of the circular spline member, and
   the flex spline member comprises a second toothed gear portion, and
   the second toothed gear portion is formed on a bottom surface of the flex spline member and is formed along an outer circumference of the flex spline member, and
   the first toothed gear portion and the second toothed gear portion are positioned to overlap in a vertical direction, and
   the wave generator member
   presses at least part of the flex spline member so that at least part of the first toothed gear portion and at least part of the second toothed gear portion are engaged with each other, and
   when the wave generator member rotates around the third central axis, portions where the first toothed gear portion and the second toothed gear portion are engaged with each other, vary, and
   a number of toothed gears of the first toothed gear portion is different from a number of toothed gears of the second toothed gear portion;
   wherein the circular spline member has a first inclined surface on the top surface thereof, the first inclined surface having a flat surface inclined downwardly toward an outside in a radial direction with the first central axis as a center;
   wherein the flex spline member has a (2-1)-th inclined surface on the bottom surface thereof, the (2-1)-th inclined surface having a flat surface inclined downwardly toward an outside in a radial direction with the second central axis as a center; and wherein an inclination angle of the first inclined surface is greater than an inclination angle of the (2-1)-th inclined surface.

2. The plate harmonic reducer of claim 1, wherein
the wave generator member is connected to a certain input terminal and is rotatable, and
the flex spline member is connected to a certain output terminal, and
a rotation speed of the output terminal is reduced with a certain reduction ratio compared to a rotation speed of the input terminal.

3. The plate harmonic reducer of claim 1, wherein
the wave generator member
has a shape of a bar extending in a horizontal direction, and
by using the third central axis as a center, a pressing protrusion protruding downwardly is provided at one end of the wave generator member and the other end that is opposite to the one end, and
the pressing protrusion is positioned on the second toothed gear portion of the flex spline member, and
portions of the first toothed gear portion and the second toothed gear portion
that are positioned under the pressing protrusion, are engaged with each other.

4. The plate harmonic reducer of claim 1, further comprising a center shaft, wherein
the center shaft is connected to the second central axis of the flex spline member, and
the flex spline member and the center shaft rotate integrally.

5. The plate harmonic reducer of claim 4, wherein
the circular spline member has a first through hole penetrating vertically in a center thereof, and
the center shaft passes through the first through hole and extends in a downward direction.

6. The plate harmonic reducer of claim 5, wherein a first bearing member through which the center shaft passes vertically is arranged in the first through hole.

7. The plate harmonic reducer of claim 4, wherein
the wave generator member has a third through hole penetrating vertically in a center thereof, and
the center shaft passes through the third through hole and extends in an upward direction.

8. The plate harmonic reducer of claim 7, wherein a second bearing member through which the center shaft passes vertically is arranged in the third through hole.

9. The plate harmonic reducer of claim 1, wherein the flex spline member has a (2-2)-th inclined surface on a top surface thereof, the (2-2)-th inclined surface being inclined downwardly toward an outside in a radial direction with the second central axis as a center.

10. The plate harmonic reducer of claim 1, wherein
the wave generator member has a shape of a bar extending in a horizontal direction, and
a pressing roller is provided
at one end and the other end of the wave generator member, respectively, and
the pressing roller is positioned on the second toothed gear portion of the flex spline member, and
portions of the first toothed gear portion and the second toothed gear portion that are positioned under the pressing roller are engaged with each other.

* * * * *